(12) United States Patent
Vashi et al.

(10) Patent No.: US 8,798,590 B2
(45) Date of Patent: Aug. 5, 2014

(54) MOBILE DEVICE WHICH DELETES DUPLICATE PREFERRED ROAMING LIST SYSTEM RECORDS FOR IMPROVED PERFORMANCE

(71) Applicant: Apple Inc., Cupertino, CA (US)

(72) Inventors: Prashant H Vashi, Sunnyvale, CA (US); Vikram B Yerrabommanahalli, Sunnyvale, CA (US); Karthik Anantharaman, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/678,701

(22) Filed: Nov. 16, 2012

(65) Prior Publication Data

US 2014/0011497 A1    Jan. 9, 2014

Related U.S. Application Data (60) Provisional application No. 61/668,957, filed on Jul. 6, 2012.

(51) Int. Cl.
*H04M 3/42* (2006.01)
*H04W 88/02* (2009.01)
*H04W 8/00* (2009.01)

(52) U.S. Cl.
CPC .............. *H04W 8/00* (2013.01); *H04W 88/02* (2013.01)
USPC ..................... 455/414.1; 455/411; 455/432.1; 455/435.1; 455/435.2; 455/558

(58) Field of Classification Search
USPC ............. 455/414.1, 411, 432.1, 435.1, 435.2, 455/422.1, 558
See application file for complete search history.

(56) References Cited

U.S. PATENT DOCUMENTS

| | | | |
|---|---|---|---|
| 6,766,167 B2 * | 7/2004 | Tung et al. | ............... 455/432.1 |
| 7,499,701 B2 | 3/2009 | Salonaho et al. | |

(Continued)

FOREIGN PATENT DOCUMENTS

| | | |
|---|---|---|
| EP | 1931062 | 6/2008 |
| EP | 2339883 | 6/2011 |

(Continued)

OTHER PUBLICATIONS

Ericsson, "CQI Reporting with Regards to DRX Operation", May 7-11, 2007, 2 pages.

(Continued)

*Primary Examiner* — Khai M Nguyen
(74) *Attorney, Agent, or Firm* — Meyertons, Hood, Kivlin, Kowert & Goetzel, P.C.

(57) ABSTRACT

A User Equipment (UE) device and associated method for operating a User Equipment (UE) in a wireless communication system. The UE may store a preferred roaming list in a memory. The preferred roaming list may comprise a plurality of system records which specify radio access technologies that can be used by the UE. The UE may examine the preferred roaming list to delete any duplicate system records in the PRL for respective geographic locations (GEOs). This may operate to mitigate the problems created by duplicate listing of system records within the PRL. In particular, the removal of redundant system records within the PRL may reduce or eliminate unneeded or undesired BSR algorithm execution. In addition, the removal of redundant system records within the PRL may reduce temporal service outages, since no service origination is allowed while the UE is attempting to find the most preferred system.

23 Claims, 5 Drawing Sheets

(56) References Cited

U.S. PATENT DOCUMENTS

| | | |
|---|---|---|
| 7,702,329 B1 * | 4/2010 | Durig et al. ............... 455/432.1 |
| 7,724,697 B2 | 5/2010 | Dalsgaard et al. |
| 7,813,721 B2 * | 10/2010 | Kim ........................... 455/414.1 |
| 7,957,360 B2 | 6/2011 | Suzuki et al. |
| 8,018,855 B2 | 9/2011 | Englund et al. |
| 8,121,045 B2 | 2/2012 | Cai et al. |
| 8,315,194 B2 | 11/2012 | Jeong et al. |
| 8,457,235 B2 | 6/2013 | Ko et al. |
| 8,498,270 B2 | 7/2013 | Iwamura et al. |
| 8,510,802 B1 * | 8/2013 | Singh et al. ........................ 726/3 |
| 8,599,816 B2 | 12/2013 | Kazmi et al. |
| 2007/0275719 A1 * | 11/2007 | Lee et al. ................... 455/435.2 |
| 2007/0287468 A1 | 12/2007 | Jeong et al. |
| 2008/0032713 A1 * | 2/2008 | Yang ............................. 455/458 |
| 2008/0043677 A1 | 2/2008 | Kim et al. |
| 2008/0045228 A1 | 2/2008 | Zhang et al. |
| 2008/0165698 A1 | 7/2008 | Dalsgaard et al. |
| 2008/0268863 A1 | 10/2008 | Pedersen et al. |
| 2009/0046652 A1 | 2/2009 | Shitara et al. |
| 2009/0207784 A1 | 8/2009 | Lee, II et al. |
| 2009/0262854 A1 | 10/2009 | Lee, II et al. |
| 2009/0279466 A1 | 11/2009 | Ji et al. |
| 2011/0077040 A1 | 3/2011 | Nammi et al. |
| 2011/0217977 A1 * | 9/2011 | Du et al. ..................... 455/432.1 |
| 2011/0269462 A1 | 11/2011 | Sagfors et al. |
| 2012/0263088 A1 | 10/2012 | Terry et al. |
| 2014/0038537 A1 * | 2/2014 | Jaisimha et al. ........... 455/161.3 |

FOREIGN PATENT DOCUMENTS

| | | |
|---|---|---|
| GB | 2494499 | 3/2013 |
| JP | 2007-189349 | 7/2007 |
| WO | 2007037218 | 4/2007 |
| WO | WO 2010118379 A1 * | 10/2010 |

OTHER PUBLICATIONS

Nokia Corporation, Nokia Siemens Networks, Samsung, "COi Reporting Configuration", Aug. 18-22, 2008, 2 pages.

International Search Report from PCT/US2013/038582, dated Apr. 29, 2013, Apple Inc., 14 pages.

* cited by examiner

MOBILE DEVICE WHICH DELETES DUPLICATE PREFERRED ROAMING LIST SYSTEM RECORDS FOR IMPROVED PERFORMANCE

PRIORITY CLAIM

The present application claims benefit of priority to U.S. Provisional Application No. 61/668,957 titled "Mobile Device Which Deletes Duplicate Preferred Roaming List System Records for Improved Performance" and filed on Jul. 6, 2012, whose inventors are Prashant H. Vashi, Vikram B. Yerrabommanahalli, and Karthik Anantharaman, and which is hereby incorporated by reference in its entirety as thought fully and completely set forth herein.

FIELD

The present invention relates generally to wireless devices, and more particularly to performance improvement strategies for devices that roam on wireless networks.

DESCRIPTION OF THE RELATED ART

Wireless communication systems are rapidly growing in usage. Further, wireless communication technology has evolved from voice-only communications to also include the transmission of data, such as Internet and multimedia content. Therefore, improvements are desired in wireless communication.

Wireless network operators can deploy new radio access technologies in parallel with earlier generation radio access technologies, and wireless networks can support multiple radio access technologies simultaneously to provide smooth transitions through multiple generations of mobile wireless devices. For example, a representative wireless network can include simultaneous support for the Third Generation Partnership Project (3GPP) Long Term Evolution (LTE) wireless communication protocol and the Third Generation Partnership Project 2 (3GPP2) CDMA2000 1x (also referred to as 1xRTT or 1x) wireless communication protocol. This exemplary "simultaneous" wireless network can support circuit switched voice connections through a first wireless network that uses the CDMA2000 1x wireless communication protocol and packet switched connections (voice or data) through a second wireless network that uses the LTE wireless communication protocol.

The 3GPP wireless communications standards organization develops mobile communication standards that include releases for Global System for Mobile Communications (GSM), General Packet Radio Service (GPRS), Universal Mobile Telecommunications System (UMTS), Long Term Evolution (LTE) and LTE Advanced standards. The 3GPP2 wireless communications standards organization develops mobile communication standards that include CDMA2000 1xRTT and 1xEV-DO standards.

Multimode UE devices may refer to UE devices that are compatible with a plurality of radio access technologies (RATs) or telecommunication standards. Multimode mobile wireless devices may include separate signal processing chips that each can support a different RAT, such as one signal processing chip for the CDMA2000 1x wireless network and another signal processing chip for the LTE wireless network.

Wireless operators, such as AT&T, Sprint, Verizon, Orange, etc. typically have roaming relationships with operators in different countries to enable accessibility of voice, data and other supplementary services for their subscribers when they travel internationally. Roaming agreements can be with operators that use the same underlying radio access technology or a different technology. For example, a 3GPP2 (Third Generation Partnership Project 2) operator can have roaming relationships with other 3GPP2 operators or 3GPP operators.

The term "Multi-Mode System Selection" (MMSS) refers to an algorithm that a multimode device utilizes to select the radio access technology (RAT) it should use for services in any particular region. In some wireless communication systems, multimode system selection (MMSS) provides a user equipment (UE) device the ability to select the best possible RAT (also referred to as "telecommunication standard") in a given area. For example, MMSS enables a UE to select the most preferred RAT for accessing different services among both 3GPP and 3GPP2 systems.

Mobile devices store a roaming list, referred to as the PRL (Preferred Roaming List), used to select the appropriate RAT for a given geographic region (GEO). The PRL stores one or more (typically a plurality of) system records for each geographic region, where each system record identifies a respective RAT that may be used by the mobile device in a respective GEO.

The goal of the PRL is to help the UE find the most preferred RAT (or telecommunication standard) within a GEO and utilize that RAT for accessing different services. If the UE cannot find the most preferred RAT within a GEO, it camps on the next available preferred system for accessing services. However, the UE uses what is called Better System Re-selection (BSR) algorithm to try the find the most preferred (or a more preferred) system when it is camped on a less preferred system.

However, in some instances the PRL might contain duplicate system records. As one example of this, the construction of one type of PRL (the EqPRL) is based on input from many files which are not controlled by the UE, but rather are controlled by the wireless operators. Thus there is a chance that a system might be listed as the most preferred system as well as a less preferred system within the same GEO. For example, a system record may end up being listed twice within the same GEO due to a change in structure/content of some files by the wireless operator(s). These changes are generally governed by forthcoming roaming relationships or other changes within a wireless operator's s service offerings.

This duplicate listing of systems will trigger the UE to execute the BSR algorithm and find the most preferred system even though it is already camped on the most preferred system. This behavior is referred to herein as "System Selection loops". System Selection loops cause unnecessary battery drain and also a temporal service outage. Battery drain is caused by the fact that the UE will try to find the most preferred system once every x seconds, even though there is no need for it to do so. Temporal service outage is caused due to the fact no service origination is allowed while the UE is trying to find the most preferred system.

Therefore, improvements are desired in the MMSS operation of wireless devices.

SUMMARY

Embodiments of the invention relate to a User Equipment (UE) device and associated method for operating a UE in a wireless communication system. In one embodiment, the UE may store a preferred roaming list in a memory. The preferred roaming list may comprise a plurality of system records which specify radio access technologies (RATs) that can be used by the UE. The UE may then examine the preferred roaming list to determine if any duplicate system records exist in the preferred roaming list for respective geographic locations (GEOs). If the UE determines that one or more duplicate system records exist in the preferred roaming list for a GEO, the UE deletes the duplicate system record(s) from the preferred roaming list for that GEO. The UE preferably deletes a less preferred duplicate system record from the preferred roaming list for the respective GEO.

In one embodiment, the UE examines the preferred roaming list and deletes any duplicate system records during creation of the preferred roaming list. In another embodiment, the UE examines the preferred roaming list and deletes any duplicate system records at predetermined intervals, e.g., whenever the UE examines the preferred roaming list for radio access technology selection.

Thus, embodiments of the invention operate to remove redundant system records within the preferred roaming list (PRL). This may operate to mitigate the problems created by duplicate listing of system records within the same GEO. In particular, the removal of redundant system records within the PRL may operate to reduce or eliminate unneeded or undesired BSR algorithm execution, i.e., System Selection Loops. In addition, the removal of redundant system records within the PRL may operate to reduce temporal service outages caused by the fact that no service origination is allowed while the UE is attempting to find the most preferred system.

BRIEF DESCRIPTION OF THE DRAWINGS

A better understanding of the present embodiments can be obtained when the following detailed description of the preferred embodiment is considered in conjunction with the following drawings, in which.

While embodiments described herein susceptible to various modifications and alternative forms, specific embodiments thereof are shown by way of example in the drawings and are herein described in detail. It should be understood, however, that the drawings and detailed description thereto are not intended to limit the embodiments to the particular form disclosed, but on the contrary, the intention is to cover all modifications, equivalents and alternatives falling within the spirit and scope of the present embodiments as defined by the appended claims.

DETAILED DESCRIPTION OF THE EMBODIMENTS

Acronyms

The following acronyms are used in the present Provisional Patent Application.

3GPP: Third Generation Partnership Project
3GPP2: Third Generation Partnership Project 2
BTS: Base Transceiver System
HRPD: High Rate Packet Data
eHRPD: Evolved High Rate Packet Data
EPC: Evolved Packet Core
eqPRL: Equivalent PRL
MMSS: Multimode System Selection
MLPL: MMSS Location Associated Priority List (MLPL)
MSPL: MMSS System Priority List
PRL: Preferred Roaming List
RAT: Radio Access Technology
UE: User Equipment
UMTS: Universal Mobile Telecommunications System
LTE: Long Term Evolution Terms The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1:
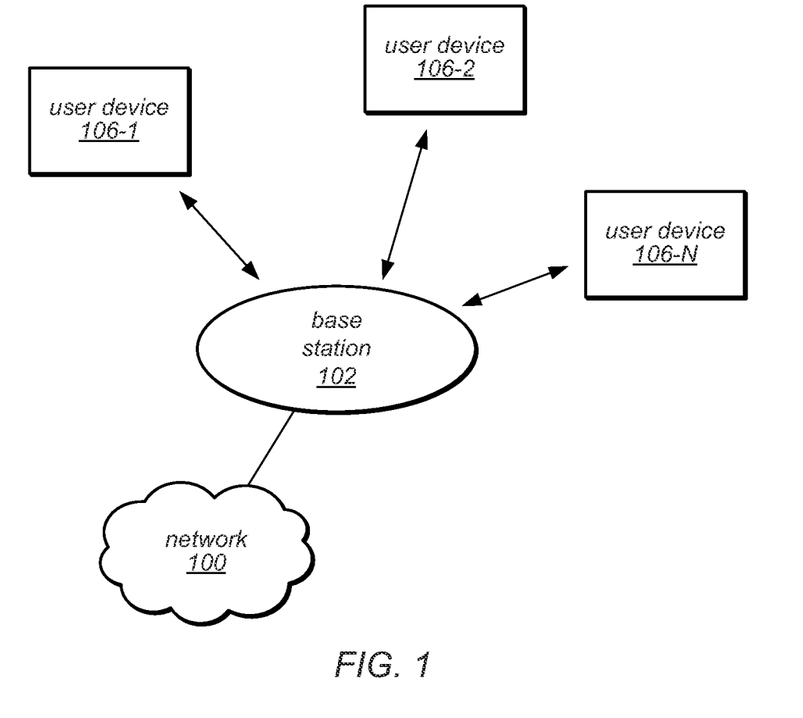
FIG. 1 illustrates an exemplary (and simplified) wireless communication system according to one embodiment.

FIG. 1—Communication System

FIG. 1 illustrates an exemplary (and simplified) wireless communication system. It is noted that the system of FIG. 1 is merely one example of a possible system, and embodiments of the invention may be implemented in any of various systems, as desired.

As shown, the exemplary wireless communication system includes a base station 102 which communicates over a transmission medium with one or more user devices 106-1 through 106-N. Each of the user devices may be referred to herein as a "user equipment" (UE). Thus, the user devices are referred to as UEs or UE devices.

The base station 102 may be a base transceiver station (BTS) or cell site, and comprises hardware that enables wireless communication with the user devices 106-1 through 106-N. The base station 102 may also be equipped to communicate with a network 100. Thus, the base station 102 may facilitate communication between the user devices and/or between the user devices and the network 100.

The base station 102 and the user devices may be configured to communicate over the transmission medium using any of various radio access technologies (RATs) or telecommunication standards such as GSM, CDMA, WLL, WAN, WiFi, WiMAX etc.

At least one UE 106, and possibly each UE 106, may be capable of communicating using multiple RATs. In other words, one or more of the UEs 106 may be multimode devices. For example, a UE 106 might be configured to communicate using either of a 3GPP radio access technology (such as LTE) or a 3GPP2 radio access technology (such as CDMA2000). Other combinations of radio access technologies (including more than two RATs) are also possible.

The UE device 106 may thus be a multi-mode wireless device and hence may be configured to communicate using multiple RATs. Depending on the location of the device, it may be preferable to join one type of network at one time, and another type of network at another time. For example, one geographic region might only support one type of network, while a different geographic region might only support the other type of network. Additionally, in some geographic areas, both types of networks may be supported, in which case one type of network may be preferred (e.g., because it is a home network, because it offers more and/or better communication capabilities, etc).

For example, a UE 106 may be able to communicate with base station 102 using a first RAT, e.g., while in the geographical area served by base station 102. The UE 106 may also be able to communicate with other base stations which utilize the first RAT, e.g., while in geographical locations served by the other base stations which utilize the first RAT. In addition, a UE 106 which is configured to communicate using multiple RATs may also be able to communicate with base stations which utilize a second RAT, e.g., while in geographical locations served by the base stations which utilize the second RAT. Note that in some cases, a base station may be able to communicate with a UE using any of multiple RATs. For example, base station 102 may be able to communicate with a UE 106 using either a first RAT or a second RAT (or both, simultaneously, e.g., using different antennas). In other cases, a particular base station may only be configured to communicate with UE devices using one RAT.

Figure 2:
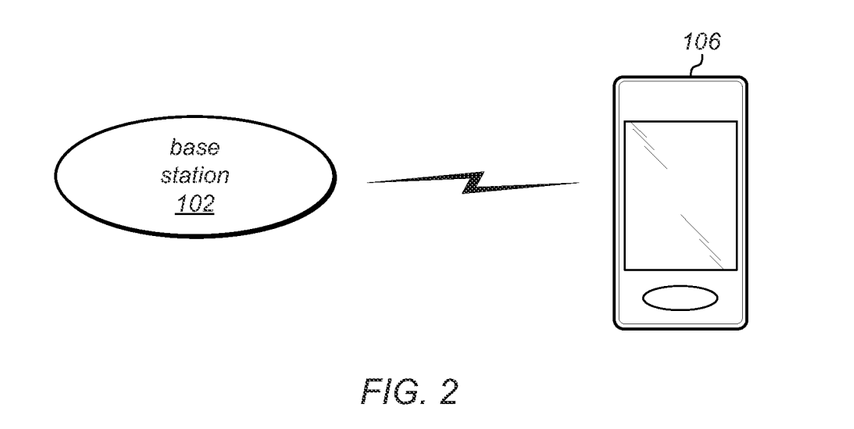
FIG. 2 illustrates a base station in communication with user equipment according to one embodiment.

FIG. 2—UE Communicating with Base Station

FIG. 2 illustrates user equipment (UE) 106 (e.g., one of the devices 106-1 through 106-N) in communication with the base station 102. The UE 106 may be a device with wireless network connectivity such as a mobile phone, a hand-held device, a computer or a tablet, or virtually any type of wireless device. As shown, the UE 106 includes a housing, an antenna attached to or coupled to the housing, and various components contained within the housing as described below with respect to FIG. 3.

The UE 106 may include a processor that is configured to execute program instructions stored in memory. The UE 106 may perform any of the methods embodiments described herein by executing such stored instructions. In some embodiments, the UE 106 may include a programmable hardware element such as an FPGA (field-programmable gate array) that is configured to perform any of the method embodiments described herein, or any portion of any of the method embodiments described herein.

In some embodiments, the UE 106 may be configured to communicate using any of multiple radio access technologies (RATs). For example, the UE 106 may be configured to communicate using either of CDMA 2000 or LTE. Other combinations of RATs are also possible.

In some embodiments, the UE 106 may include a plurality of receive antennas and a corresponding plurality of receive chains. The term "receive chain" may refer to a processing path for the received signal. For example, the UE 106 may include separate signal processing chips, each having a respective receive chain, for each of multiple radio access technologies. Alternatively (or in addition), multiple radio access technologies may share one or more parts of a receive chain in the UE 106 in some embodiments.

Figure 3:
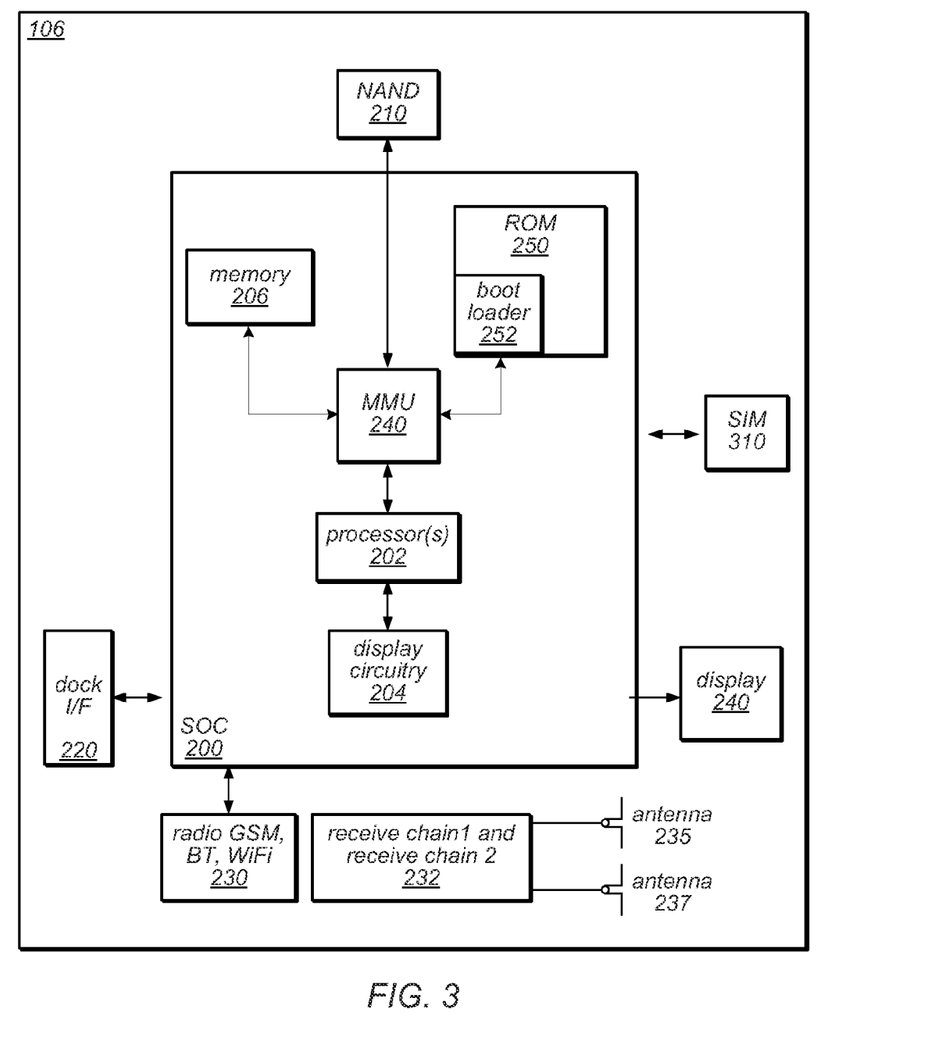
FIG. 3 illustrates an exemplary block diagram of a user equipment device, according to one embodiment.

FIG. 3—Exemplary Block Diagram of a UE

FIG. 3 illustrates an exemplary block diagram of a UE 106. As shown, the UE 106 may include a system on chip (SOC) 200, which may include portions for various purposes. For example, as shown, the SOC 200 may include processor(s) 202 which may execute program instructions for the UE 106 and display circuitry 204 which may perform graphics processing and provide display signals to the display 240. The processor(s) 202 may also be coupled to memory management unit (MMU) 240, which may be configured to receive addresses from the processor(s) 202 and translate those addresses to locations in memory (e.g., memory 206, read only memory (ROM) 250, NAND flash memory 210) and/or to other circuits or devices, such as the display circuitry 204, radio 230, connector I/F 220, and/or display 240. In some embodiments, the MMU 240 may be included as a portion of the processor(s) 202.

In the embodiment shown, ROM 250 may include a bootloader 252, which may be executed by the processor(s) 202 during boot up or initialization. As also shown, the SOC 200 may be coupled to various other circuits of the UE 106. For example, the UE 106 may include various types of memory (e.g., including NAND flash 210), a connector interface 220 (e.g., for coupling to the computer system), the display 240, and wireless communication circuitry (e.g., for LTE, CDMA2000, Bluetooth, WiFi, etc.).

The UE device 106 may include at least one antenna, and in some embodiments multiple antennas, for performing wireless communication with base stations. For example, the UE device 106 may use antennas 235 and 237 to perform the wireless communication. The UE 106 may be configured to communicate wirelessly using multiple (e.g., at least two) RATs.

As shown, the UE 106 may include a SIM (Subscriber Identity Module) 310, which may also be referred to as a smart card. The SIM 310 may take the form of a removable SIM card. As one example, the SIM 310 may be a Universal Integrated Circuit Card (UICC) 310. In some embodiments, the SIM 310 may store a preferred roaming list (PRL). The PRL may include one or more system records for each of various geographic regions, wherein each system record corresponds to or specifies a respective RAT. Each system record is a data structure comprising information that corresponds to or specifies a respective RAT.

The processor 202 of the UE device 106 may be configured to implement part or all of the methods described herein, e.g., by executing program instructions stored on a memory medium (e.g., a non-transitory computer-readable memory medium). In other embodiments, processor 202 may be configured as programmable hardware element, such as an FPGA (Field Programmable Gate Array), or as an ASIC (Application Specific Integrated Circuit).

Figure 4:
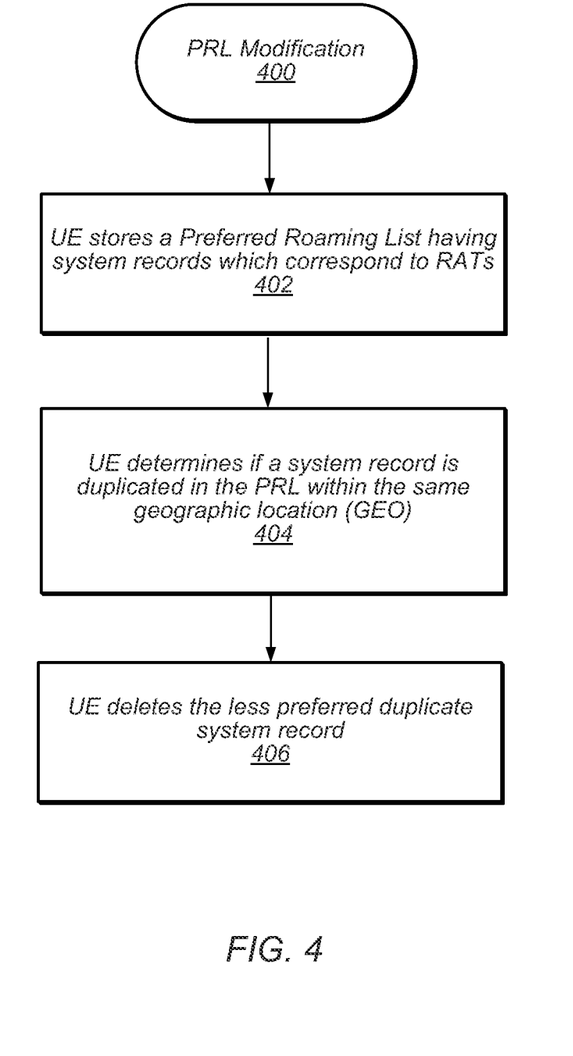
FIG. 4 is a flowchart of a method for operating a user equipment device which removes duplicate system records from the preferred roaming list.

FIG. 4—Removal of Redundant System Records within the PRL

FIG. 4 is a flowchart illustrating operation of one embodiment of the invention for modifying a Preferred Roaming List to remove duplicate system records in the PRL. The method shown in FIG. 4 may be performed by one or more of the UEs 106. Alternatively, the method may be used in conjunction with any of the systems or devices shown in the above Figures, among other devices. In various embodiments, some of the method elements shown may be performed concurrently, in a different order than shown, or may be omitted. Note also that additional method elements may also be performed as desired.

In 402 the UE 106 stores a Preferred Roaming List (PRL). The PRL comprises one or more (typically a plurality of) system records for each respective geographic location (GEO), where each system record corresponds to a Radio Access Technology (RAT). The PRL may be any of various PRL versions, including any of PRL versions A through E, inclusive. The PRL may be created by the UE 106, or received by the UE 106 from a base station. In one embodiment, the UE 106 may receive a first PRL from a base station and use this first PRL and other information to generate a second PRL.

The Preferred Roaming List (PRL) is a data structure (e.g., a database) residing in a wireless device, such as a cell phone, that contains information used during the system (RAT) selection and acquisition process. The PRL may indicate which bands, sub bands and service provider identifiers will be scanned and in what priority order. The PRL is used by the UE 106 to allow the UE 106 to "roam", i.e., to obtain service outside of the home area. The PRL on a UE 106 may be updated periodically. This is desirable if the subscriber uses the UE 106 outside the home area frequently, particularly if they do so in multiple different areas. This allows the UE 106 to choose the best roaming carriers, particularly "roaming partners" with whom the home carrier has a cost-saving roaming agreement, rather than using non-affiliated carriers. PRL files can also be used to identify home networks along with roaming partners, thus making the PRL an actual list that determines the total coverage of the subscriber, both home and roaming coverage.

In 404 the UE 106 determines if a system record is duplicated in the PRL within the same geographic location (GEO). In step 404 the UE 106 determines that a system record is duplicated if two system records present in the PRL are exact copies of each other. As one example, the PRL may contain a first system record that corresponds to a first RAT and also may contain a second system record that also corresponds to the first RAT, but the first and second system records have different system identifications. In this example, the UE 106 would NOT determine these system records to be duplicates, as they are not exact copies of each other.

If the UE 106 determines that a duplicate system record exists in the PRL, in 406 the UE 106 deletes one of the duplicate PRLs. In one embodiment, the UE 106 deletes the less preferred duplicate system record. For example, the PRL typically has system records sorted from most preferred to least preferred. If the UE 106 discovers that the PRL includes two identical system records, the UE 106 deletes the least preferred system record (the one lower in the list) and the more preferred system record remains in the PRL.

In one embodiment, the UE 106 deletes the duplicate system record from both the copy of the PRL in the random access memory (RAM) 206 where the PRL is being used as well as the ROM 250 (e.g., flash memory). This ensures that the PRL is properly modified. In an alternate embodiment, the UE 106 only modifies the copy of the PRL in the random access memory (RAM) 206.

Figure 5:
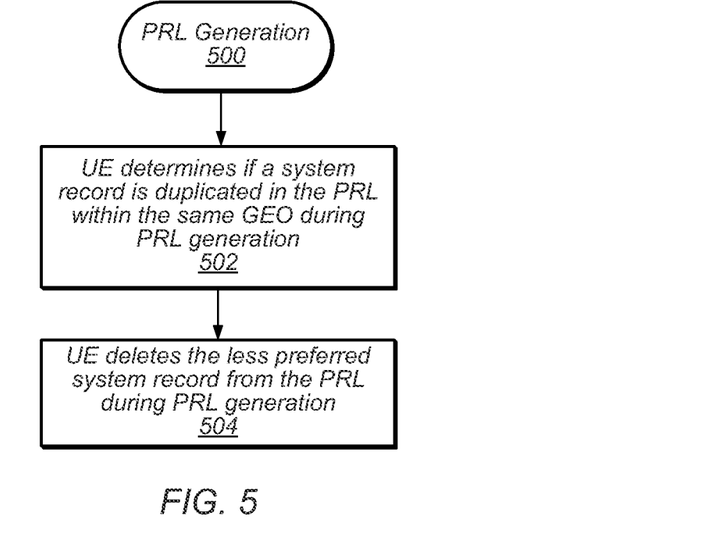
FIG. 5 is a flowchart illustrating determination and deletion of duplicate system records in the preferred roaming list during creation of the PRL.

In a first exemplary embodiment, steps 404 and 406 of FIG. 4 are performed while the PRL is being generated by the MMSS algorithm. This is illustrated in FIG. 5. Thus, in this embodiment, as the UE 106 is creating the PRL, the UE 106 checks to determine if a system record is listed twice within the same GEO of the PRL in 502. If the UE 106 determines that the system is listed twice within the same GEO, then the UE 106 deletes the less preferred system record from the PRL in 504.

Figure 6:
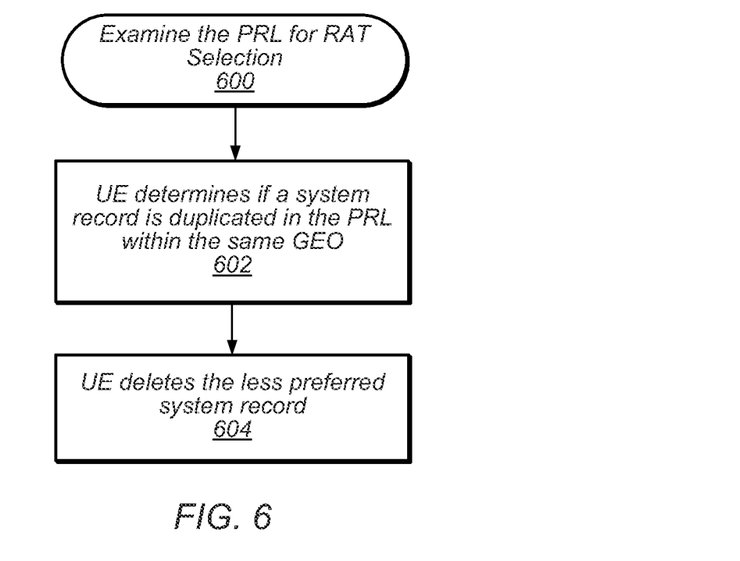
FIG. 6 is a flowchart illustrating determination and deletion of duplicate system records in the preferred roaming list during system selection.

In a second exemplary embodiment, steps 404 and 406 of FIG. 4 are performed after the PRL has been created and stored. In this embodiment, the UE 106 examines the PRL after it has been created and removes redundant system records. For example, as shown in the FIG. 6, the UE 106 may perform steps 404 and 406 at every RAT selection instance (steps 602 and 604 of FIG. 6. The UE 106 may instead (or also) perform steps 404 and 406 based on some other repetitive or periodic basis and remove duplicate system records from the PRL.

Thus, as described herein, embodiments of the invention operate to remove redundant system records within the preferred roaming list (PRL). This may operate to mitigate the problems created by duplicate listing of systems within the same GEO. In particular, the removal of redundant system records within the PRL may operate to reduce or eliminate unneeded or undesired BSR algorithm execution, i.e., System Selection Loops. In addition, the removal of redundant system records within the PRL may operate to reduce temporal service outages caused by the fact that no service origination is allowed while the UE 106 is attempting to find the most preferred system.

Figure 7:
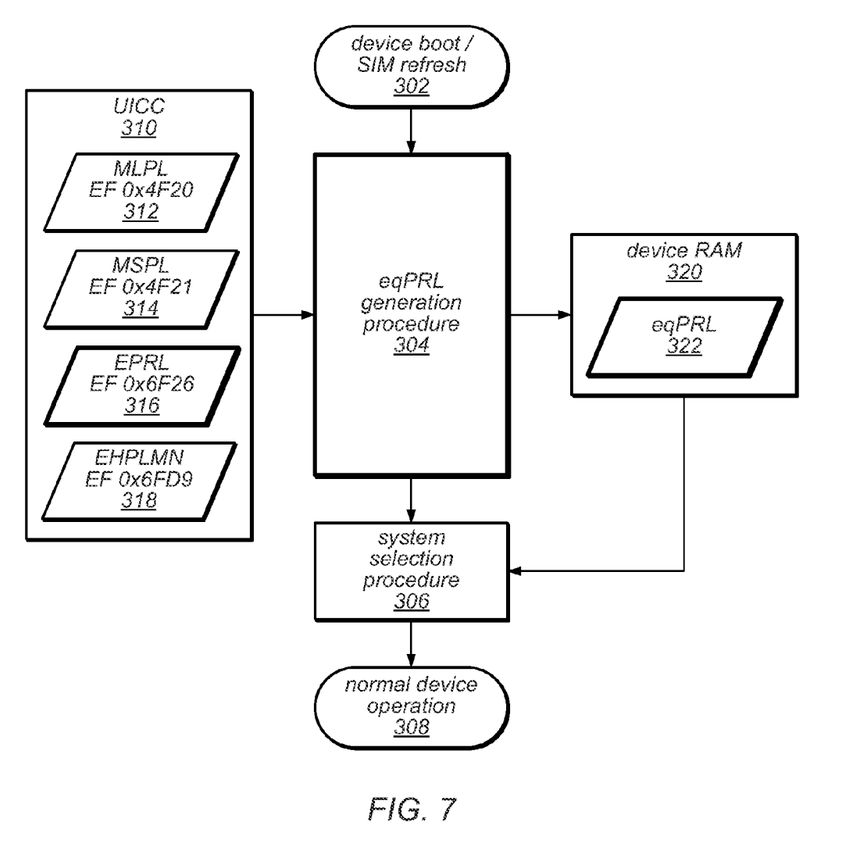
FIG. 7 illustrates an exemplary PRL generation procedure which includes deletion of duplicate system records in the PRL.

FIG. 7

FIG. 7 illustrates an exemplary embodiment of the invention which uses a first preferred roaming list (e.g., EPRL 316) as well as other information to generate a second preferred roaming list (e.g., eqPRL 322). According to embodiments of the invention, the method may operate to remove redundant system records from the second preferred roaming list as it is being created.

In order to account for the various roaming possibilities available to multi-mode UE device 106, the UE device 106 may employ a Multi-Mode System Selection (MMSS) capability in order to select a preferred telecommunication standard to use in a given area.

The UE 106 may initially boot up (or alternatively, may perform a SIM refresh), e.g., as shown in the exemplary embodiment of FIG. 7 in step 302. One or more priority lists may be made available to the UE device 106 in order to assist the UE 106 to select a telecommunication standard. According to some embodiments, one or more such priority lists may be stored on a smart card, such as Universal Integrated Circuit Card (UICC) 310. In some embodiments, priority lists may be stored in a subscriber identity module (SIM) on the smart card. The priority lists may be made available to the UE 106 prior to initial operation of the UE 106 (e.g., during configuration of the UE 106 by a service provider) in some embodiments. Alternatively, or in addition, the priority lists may be made available (and/or updated) during operation of the UE device 106, e.g., by request of a user, or automatically. Automatic updating or initial downloading of the priority lists to the smart card of the UE device 106 may be initiated by either a base station (e.g., the network/service provider) or the UE device 106 itself, according to various embodiments.

It may be common for one priority list (a "location priority list" or "LPL") to be used to group sets of networks (which may operate according to different telecommunication standards) which may be present in the same geographic region. In the exemplary embodiment of FIG. 7, MMSS Location Priority List (MLPL) 312 may function as an LPL in some embodiments.

The LPL may also assign a relative priority to each network and/or telecommunication standard per listing, in some embodiments. Alternatively, the LPL may refer to (or include pointers to) one or more additional lists which assign relative priority to each of multiple networks (and/or telecommunication standards) according to different scenarios (e.g., home, roaming, scenarios specific to particular geographic areas, or other scenarios). Such a set of lists may be referred to as a "system priority list" or "SPL". In the exemplary embodiment of FIG. 7, MMSS System Priority List (MSPL) 314 may function as an SPL in some embodiments.

A further priority list that may be available in some embodiments is a first preferred roaming list (PRL). The first PRL may include information relating to the availability of networks which operate according to a first telecommunication standard in various geographic locations. One example of such a first PRL is the IS-683D PRL which may be used in UE devices configured to communicate using a 3GPP2 telecommunication protocol in some embodiments. In the exemplary embodiment of FIG. 7, EPRL 316 (which may also be an IS-683D PRL) may function as a first PRL.

In at least some embodiments of the invention, the first PRL includes information that is useable to identify geographic regions which support multiple telecommunication standards and regions which support only one telecommunication standard (or a smaller subset). It is noted that in current systems telecommunication carriers may not provide this type of information in the first PRL. However, in embodiments of the invention, the carriers provide this information in the first PRL. As one example, the carriers may provide this information as Mobile Country Codes (MCCs).

The first PRL may enable the UE device 106 to identify and select access points (e.g., cells provided by base stations) provided by its service provider outside of its "home" region, e.g., while "roaming". In some embodiments the first PRL may also assist the UE 106 in identifying access points provided by other service providers, which may utilize the same telecommunication standard as the home service provider of the UE device, e.g., while roaming in a different geographic region than its home region. Note that the first PRL may also assist in identifying networks/access points within the UE device's home region (which may typically be provided by its service provider, but may also or alternatively be provided by other service providers), in some embodiments. Alternatively, another file or data structure, such as equivalent home public land mobile network identifier (EHPLMN) 318 shown in FIG. 7, may be available to assist in identifying/selecting home region networks/access points. The first PRL may also provide information used for identifying the availability of telecommunication standards as described herein.

Together, the first PRL and the LPL (and in some cases the SPL) may be used by the UE device 106 to construct a second PRL which includes information relating to the availability of multiple telecommunication standards in various geographic locations. That is, since the first PRL may include information identifying which networks operating according to a first telecommunication standard may be available in each of multiple geographical regions, and the LPL may include information identifying which networks of different telecommunication standards may co-exist in a geographic region, the UE 106 may be able to combine the information to generate a second PRL which includes information relating to the availability of networks which operate according to any of multiple telecommunication standards in various geographic locations. The SPL (or LPL) may also be used to prioritize the networks listed in the second PRL for a given geographic region, in some embodiments. The second PRL may then be stored.

According to the exemplary embodiment of FIG. 7, the process of generating the second PRL based on the first PRL and the LPL (and possible the SPL) is shown as step 304 and is performed by the UE device 106. The second PRL may be exemplified by eqPRL 322 (which may be an IS-683E PRL, in some embodiments) shown in FIG. 7, which may be stored in device RAM 320.

According to embodiments of the invention, as described above in FIG. 5, when the second PRL is being generated in FIG. 7 the UE 106 may in 502 determine if a system record is duplicated in the second PRL within the same GEO. If the UE 106 determines that a system record is duplicated in the second PRL, then in 504 the UE 106 deletes the one or more duplicates. In one embodiment, the UE 106 deletes the less preferred system record.

Once the second PRL has been generated (and stored), it may be used by the UE to search for and select a network in any given geographical region. This is shown in the exemplary embodiment of FIG. 4 as step 306.

Once a network has been selected, normal device operation may commence. This is shown in the exemplary embodiment of FIG. 4 as step 308.

In some embodiments, the UE device 106 operates to examine the second PRL and remove duplicate records at certain times after the second PRL has been created. For example, as described above in FIG. 6, in a second exemplary embodiment, the UE 106 examines the PRL at every System Selection instance (step 602) and removes one or more duplicate records from the eqPRL within a GEO (step 604). This method may be useful where the second PRL is changed, e.g., by a base station, after creation. In addition, in some embodiments the base station 102 (e.g., a telecommunication carrier) may perform the operation of creating the second PRL (e.g., eqPRL 322) as described herein. In these embodiments, the base station 102 creates and provides the second PRL in a wireless manner to the UE device 106, which receives and stores the second PRL, either in the SIM 310 or RAM 320. In this situation, since the UE 106 does not create the second PRL, the UE 106 operates to remove duplicate records from the PRL when it is received from the base station 102, or periodically when the eqPRL is examined as mentioned above.

Embodiments of the invention may thus operate to mitigate the problems created by duplicate listing of system records within the same GEO of the PRL. In particular, embodiments of the invention operate to remove redundant system records within the PRL. This operates to reduce or eliminate unneeded or undesired BSR algorithm execution, i.e., System Selection Loops, and also operates to reduce a temporal service outage.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for operating a mobile wireless User Equipment (UE), the method comprising:
    storing a preferred roaming list in a memory of the UE, wherein the preferred roaming list comprises a plurality of system records which specify radio access technologies that can be used by the UE;
    examining the preferred roaming list to determine if any duplicate system records exist in the preferred roaming list;
    deleting at least one duplicate system record from the preferred roaming list in response to determining that the at least one duplicate system record exists in the preferred roaming list;
    wherein said deleting the at least one duplicate system record comprises deleting a less preferred duplicate system record from the preferred roaming list.
2. The method of claim 1, further comprising:
    creating, by the UE, the preferred roaming list;
    wherein said examining the preferred roaming list and said deleting at least one duplicate system record are performed during said creating the preferred roaming list.
3. The method of claim 1,
    wherein said examining the preferred roaming list is performed when the UE examines the preferred roaming list for radio access technology selection.
4. The method of claim 1,
    wherein said examining determines that duplicate system records exist in the preferred roaming list if two system records present in the preferred roaming list are exact copies of each other.
5. The method of claim 1,
    wherein the preferred roaming list comprises a first system record that corresponds to a first radio access technology and a second system record that also corresponds to the first radio access technology, wherein the first and second system records have different system identifications;
    wherein said examining determines that the first system record and the second system record are not duplicates of each other.
6. The method of claim 1,
    wherein said deleting the at least one duplicate system record comprises deleting both a copy of the at least one duplicate system record in a random access memory and a copy of the at least one duplicate system record from a non-volatile memory of the UE device.
7. The UE device of claim 6, wherein the plurality of data structures comprise a plurality of system records.
8. The UE device of claim 6,
    wherein the UE device is a mobile, wireless telephone.
9. The method of claim 1, further comprising:
    the UE device selecting a radio access technology based on the preferred roaming list.
10. The method of claim 1,
    wherein the preferred roaming list is an Equivalent Preferred Roaming List (eqPRL).
11. A user equipment (UE) device, the UE device comprising:
    an antenna for performing wireless communications with a base station;
    a memory configured to store a preferred roaming list, wherein the preferred roaming list comprises information regarding an ordering of radio access technologies to be examined for roaming in one or more geographic locations;
    a processor configured to examine the preferred roaming list to determine if any duplicate information exists in the preferred roaming list, and delete at least one duplicate piece of information from the preferred roaming list;
    wherein a less preferred duplicate piece of information is deleted from the preferred roaming list.
12. The UE device of claim 11,
    wherein the processor is further configured to create the preferred roaming list;
    wherein the processor is configured to examine the preferred roaming list and delete at least one duplicate piece of information during creation of the preferred roaming list.
13. The UE device of claim 11,
    wherein the processor is further configured to examine the preferred roaming list for radio access technology selection;
    wherein the processor is configured to examine the preferred roaming list for duplicate information and delete at least one duplicate piece of information when the UE examines the preferred roaming list for radio access technology selection.

14. The UE device of claim 11, wherein the UE device is configured to select a radio access technology based on the preferred roaming list.

15. The UE device of claim 11, wherein the UE device comprises a non-volatile memory which stores a first copy of the preferred roaming list and a random access memory which stores a second copy of the preferred roaming list;
wherein the processor is configured to delete the at least one duplicate system record from both the first copy of the preferred roaming list and the second copy of the preferred roaming list.

16. The UE device of claim 11, wherein the UE device comprises a non-volatile memory which stores a first copy of the preferred roaming list and a random access memory which stores a second copy of the preferred roaming list;
wherein the processor is configured to delete the at least one duplicate system record from only the second copy of the preferred roaming list.

17. The UE device of claim 11, wherein the preferred roaming list comprises a plurality of data structures for each respective geographic location (GEO), where each data structure corresponds to a Radio Access Technology (RAT).

18. A non-transitory computer readable memory medium in a User Equipment (UE), wherein the UE is a mobile wireless device capable of roaming on various networks, wherein the memory medium comprises program instructions which are executable to:
store a preferred roaming list in a memory of the UE, wherein the preferred roaming list comprises a plurality of system records which specify radio access technologies that can be used by the UE;
examine the preferred roaming list to determine if any duplicate system records exist in the preferred roaming list;
delete at least one duplicate system record from the preferred roaming list in response to determining that the at least one duplicate system record exists in the preferred roaming list;
wherein the preferred roaming list comprises a first system record that corresponds to a first radio access technology and a second system record that also corresponds to the first radio access technology, wherein the first and second system records have different system identifications;
wherein said examining determines that the first system record and the second system record are not duplicates of each other.

19. The non-transitory computer readable memory medium of claim 18, wherein the program instructions are further executable to:
create the preferred roaming list;
wherein the program instructions examine the preferred roaming list and delete at least one duplicate system record during creation of the preferred roaming list.

20. The non-transitory computer readable memory medium of claim 18, wherein the program instructions examine the preferred roaming list when the program instructions examine the preferred roaming list for radio access technology selection.

21. The non-transitory computer readable memory medium of claim 18, wherein, when deleting at least one duplicate system record, the program instructions delete a less preferred duplicate system record from the preferred roaming list.

22. The non-transitory computer readable memory medium of claim 18, wherein the program instructions determine that duplicate system records exist in the preferred roaming list if two system records present in the preferred roaming list are exact copies of each other.

23. A handheld wireless telephone device, the telephone device comprising:
a housing;
an antenna attached to the housing for performing wireless communications with a base station;
a memory contained within the housing and configured to store a preferred roaming list, wherein the preferred roaming list comprises information regarding an ordering of radio access technologies to be examined for roaming in one or more geographic locations;
a processor contained within the housing and configured to examine the preferred roaming list to determine if any duplicate information exists in the preferred roaming list, and delete at least one duplicate piece of information from the preferred roaming list;
wherein the preferred roaming list comprises a first system record that corresponds to a first radio access technology and a second system record that also corresponds to the first radio access technology, wherein the first and second system records have different system identifications;
wherein said examining determines that the first system record and the second system record are not duplicates of each other.

* * * * *